Nov. 1, 1966
L. G. MALM
3,282,436
COMBINED BY-PASS AND/OR DISTRIBUTION SEDIMENT-THICKENING
UNIT FOR SEWAGE PURIFICATION PLANTS
Filed June 17, 1963
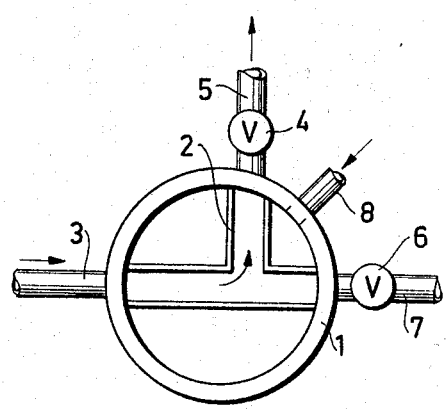
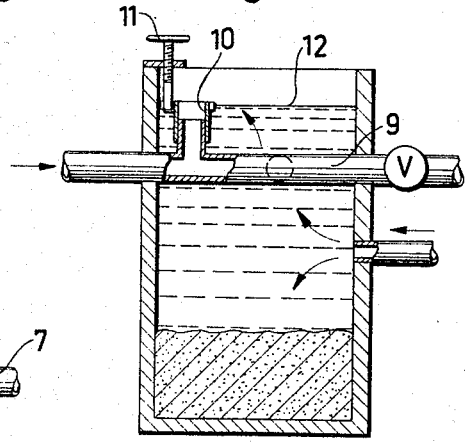
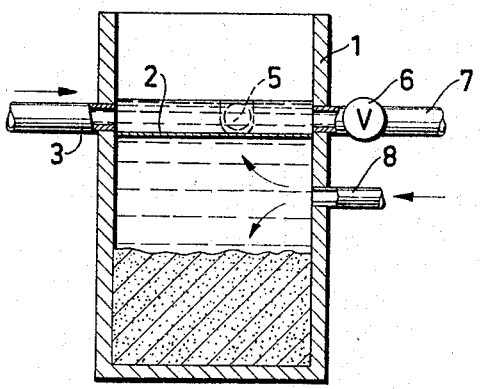
INVENTOR
Lars Gösta Malm
BY Stevens, Davis, Miller & Mosher
ATTORNEYS

United States Patent Office 3,282,436
Patented Nov. 1, 1966

3,282,436
COMBINED BY-PASS AND/OR DISTRIBUTION SEDIMENT-THICKENING UNIT FOR SEWAGE PURIFICATION PLANTS
Lars Gösta Malm, Roslags Nasby, Sweden, assignor to Industrikemiska Aktiebolaget, Stockholm, Sweden, a corporation of Sweden
Filed June 17, 1963, Ser. No. 288,345
1 Claim. (Cl. 210—519)

Practically all sewage purification plants employing the active sludge or other method of purification incorporate diverting means which enable the flow of sewage into the purification plant to be shut off during repair work etc. The diverting means can also be used to route the sewage to different tanks. As a rule these diverting means consist of a system of channels or ducts each of which can be closed by means of a valve, gate or other shut-off device. There are a great number of different arrangements. In many cases the diverting means incorporate a weir which, in the event of an excess flow of sewage, diverts the excess and in this way safeguards the purification plant from becoming overloaded. The diverting means with weirs etc. are generally located in a concrete well or shaft to which the necessary pipes or ducts are connected.

One result of purifying sewage by the active sludge or other purification method is that the remaining sludge contains a very large percentage of water. This high water content constitutes a major problem in that it results in very large volumes of sludge. In order to reduce the volume of sludge as much as possible the sludge is sometimes concentrated in a sludge thickener or concentrator. A thickener consists of a tank or container into which the sludge is fed intermittently or continuously. The sludge settles to the bottom of the tank and is in this way concentrated. The residue, that is the so-called sludge water, lies above the deposited sludge and contains a negligible amount of sludge. This water can be withdrawn via a channel, the edges of which serve as a weir over which the water runs into the channel. As a rule the sludge water is then returned to the inlet of the purification plant and purified with the sewage. When the thickener operates intermittently the channel or corresponding device can be made vertically adjustable so that the sludge water above the sludge can be decanted. Obviously, decanting can also be carried out with a fixed channel with adjustable sides.

Since some form of diverting means can hardly be avoided practically all purification plants incorporate diverting wells. Sludge thickeners are also very desirable but, owing to the necessary foundation work, pipe systems for the decanted sludge water etc., the cost is not always justified. This is generally the case at small sewage purification plants.

The object of this invention is to make possible the use of a sludge thickener under circumstances where such an arrangement was previously unjustified on the grounds of expense. With this object in view the invention relates to a combined diverting and/or distribution and sludge-thickening unit for sewage purification plants operating in accordance with the active sludge or other purification method so devised that the cost of manufacture, and possibly also the operating costs are considerably reduced and, at the same time, the construction of the unit is greatly simplified. According to the invention this is achieved with the aid of a well, the lower part of which is constructed as a collector for the sludge formed in the sewage purification step, and which is to be thickened, while the upper part of the well contains means for diverting and/or distributing of the sewage and the discharge of the sludge water remaining after the sludge has been concentrated. Further details of the invention are given below in connection with a description of two embodiments of combined units according to the invention as shown on the attached drawing.

FIGS. 1 and 2 on the drawing show one form in plan view and in longitudinal section respectively, while FIG. 3 shows the other form in a longitudinal section corresponding to that in FIG. 2.

At the top of well 1 is a completely or partially open distribution channel 2. When the purification plant is in operation the sewage enters through inlet 3 and is led via distribution channel 2 and through valve 4 and branch pipe 5 to the purification plant proper. The inlet runs into an outlet 7 fitted with a cut-out valve. When the purification plant is not in operation valve 4 is closed and outlet valve 6 opened. The sewage then passes direct to outlet 7.

The lower part of the well is constructed as a sludge thickener. The sludge to be thickened or concentrated enters through a pipe 8 in the well 1. The sludge settles to the bottom while the sludge water rises and runs over into distribution channel 2 where it mixes with the sewage and is further conveyed via branch pipe 5 to the purification plant proper. Thus no special channel or the like is required for the discharge of the sludge water nor is any special pipe required to return the sludge water to the purification plant.

In the case of the arrangement shown in FIGS. 1 and 2 the sludge water is removed substantially continuously as long as fresh sludge is fed into the container. If required the sludge water can be drawn off intermittently by means of, for example, vertically adjustable sides on distribution channel 2 or by means of a vertically adjustable decanting pipe connected to distribution channel 2. Before decanting, the height of the level of the sludge water is then higher than the level of the sewage in the distribution channel 2. The distribution channel must in that case have higher edges than are shown in FIG. 2 or also must be closed at the top.

One example of such an arrangement is shown in FIG. 3, where the distribution channel according to FIGS. 1 and 2 is replaced by a closed distribution pipe 9. To this pipe 9 is connected a vertically adjustable pipe 10, the upper edge of which functions as a weir when decanting the sludge water. Pipe 10 can be raised and lowered by means of wheel 11. Before decanting, the level of the sludge water is above distribution pipe 9. When decanting is to take place, pipe 10 is lowered by means of wheel 11, the sludge water is then decanted via pipe 10 to distribution pipe 9 where it is mixed with the sewage and passed together with it to the purification plant proper.

I claim:

A combined flow distribution and sludge thickening apparatus for a sewage purification plant, said apparatus comprising a well, a sludge inlet means connected to said well above the bottom thereof for introducing sewage sludge to be thickened into said well, the lower part of said well being adapted to serve as a collector for the thickened sludge, a sewage inlet and at least two sewage outlets connected to said well, a closed branched pipe disposed in said well in communication with said sewage inlet and each of said sewage outlets, an adjustable weir comprising an open-ended pipe registering with said branched pipe and communicating with the interior of said well so that sludge water separated from the thickened sludge may enter said branched pipe through said weir and leave said branched pipe through oue of said outlets together with sewage entering through said sewage inlet, and means to regulate the length of said weir according to the level of sludge water in said well.

(References on following page)

References Cited by the Examiner

UNITED STATES PATENTS

| | | | |
|---|---|---|---|
| 1,456,312 | 5/1923 | Imhoff | 210—532 X |
| 3,168,465 | 2/1965 | Kraus et al. | 210—221 X |
| 3,187,897 | 6/1965 | Walker | 210—197 |

REUBEN FRIEDMAN, *Primary Examiner.*

J. DE CESARE, *Assistant Examiner.*